United States Patent
Zhang

(10) Patent No.: US 11,924,915 B2
(45) Date of Patent: Mar. 5, 2024

(54) ENHANCED PLMN COVERAGE FOR MOBILE DEVICES

(71) Applicant: T-Mobile USA, Inc., Bellevue, WA (US)

(72) Inventor: Lin Zhang, Overland Park, KS (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 17/708,620

(22) Filed: Mar. 30, 2022

(65) Prior Publication Data

US 2023/0319541 A1 Oct. 5, 2023

(51) Int. Cl.
| | |
|---|---|
| *H04W 48/10* | (2009.01) |
| *H04W 8/06* | (2009.01) |
| *H04W 24/08* | (2009.01) |
| *H04W 84/04* | (2009.01) |

(52) U.S. Cl.
CPC ............ *H04W 8/06* (2013.01); *H04W 24/08* (2013.01); *H04W 48/10* (2013.01); *H04W 84/042* (2013.01)

(58) Field of Classification Search
CPC ....... H04W 8/06; H04W 24/08; H04W 48/10; H04W 84/042
See application file for complete search history.

(56) References Cited

U.S. PATENT DOCUMENTS

| | | | | |
|---|---|---|---|---|
| 8,385,919 B1 * | 2/2013 | Jokinen | ............ | H04W 36/0066 |
| | | | | 455/437 |
| 10,219,309 B2 * | 2/2019 | Zhu | ........................ | H04W 8/00 |
| 11,665,633 B2 * | 5/2023 | Ohlsson | ................ | H04W 48/12 |
| | | | | 455/434 |
| 2002/0119776 A1 * | 8/2002 | Vestergaard | .......... | H04W 60/04 |
| | | | | 455/436 |
| 2006/0291455 A1 * | 12/2006 | Katz | ....................... | H04L 67/14 |
| | | | | 370/328 |
| 2007/0004402 A1 * | 1/2007 | Buckley | ................ | H04W 48/16 |
| | | | | 455/432.1 |

(Continued)

FOREIGN PATENT DOCUMENTS

| | | | | |
|---|---|---|---|---|
| CA | 2757569 A1 * | 10/2010 | ........ | H04W 36/0066 |
| EP | 1881725 B1 * | 6/2011 | ............ | H04W 48/18 |

(Continued)

*Primary Examiner* — Yuwen Pan
*Assistant Examiner* — Swati Jain
(74) *Attorney, Agent, or Firm* — Lee & Hayes P.C.

(57) ABSTRACT

Disclosed herein are techniques, devices, and systems for a mobile device to keep track of public land mobile networks (PLMNs) codes from a list(s) of equivalent PLMNs that the mobile device received at a time of performing a past registration procedure(s). For example, memory of the mobile device may store a PLMN code(s) from a list of equivalent PLMNs that the mobile device received from a mobility management entity (MME) or an access and mobility function (AMF) node. During a subsequent registration, the mobile device may send a message to another MME or another AMF node, and may receive a message, such as an ATTACH ACCEPT message or a REGISTRATION ACCEPT message, from the other MME or the other AMF node. In response to receiving the message, the mobile device can maintain the stored PLMN code(s) in the memory.

20 Claims, 5 Drawing Sheets

(56) References Cited

U.S. PATENT DOCUMENTS

| | | | |
|---|---|---|---|
| 2007/0135124 A1* | 6/2007 | Davolos | H04W 8/04 455/433 |
| 2009/0005033 A1* | 1/2009 | Wijayanathan | H04W 76/25 455/426.1 |
| 2012/0064883 A1* | 3/2012 | Kim | H04W 8/205 455/422.1 |
| 2012/0077456 A1* | 3/2012 | Tiwari | H04W 48/16 455/404.1 |
| 2012/0157095 A1* | 6/2012 | Fodor | H04W 4/08 455/434 |
| 2012/0244868 A1* | 9/2012 | Liu | H04W 24/02 455/446 |
| 2013/0040634 A1* | 2/2013 | Johansson | H04W 24/10 455/422.1 |
| 2013/0053037 A1* | 2/2013 | Jokinen | H04W 36/00837 455/436 |
| 2014/0378129 A1* | 12/2014 | Jiang | H04W 60/00 455/432.1 |
| 2015/0045025 A1* | 2/2015 | Lim | H04W 36/00837 455/434 |
| 2015/0351021 A1* | 12/2015 | Zhang | H04W 48/18 455/432.1 |
| 2016/0242138 A1* | 8/2016 | Basavaraj | H04W 8/082 |
| 2017/0215134 A1* | 7/2017 | Liu | H04W 8/26 |
| 2017/0311236 A1* | 10/2017 | Cao | G06K 7/1417 |
| 2017/0339550 A1* | 11/2017 | Liu | H04W 8/02 |
| 2019/0029065 A1* | 1/2019 | Park | H04W 48/02 |
| 2019/0182655 A1* | 6/2019 | Gupta | H04W 76/27 |
| 2019/0394719 A1* | 12/2019 | Soliman | H04W 48/18 |
| 2020/0008140 A1* | 1/2020 | Kim | H04W 60/00 |
| 2020/0092798 A1* | 3/2020 | Abraham | H04W 88/06 |
| 2020/0178196 A1* | 6/2020 | Wang | H04W 76/16 |
| 2020/0221281 A1* | 7/2020 | Rajadurai | H04W 8/06 |
| 2020/0267632 A1* | 8/2020 | Lindheimer | H04W 48/16 |
| 2021/0051578 A1* | 2/2021 | Sethi | H04W 8/08 |
| 2021/0258869 A1* | 8/2021 | Di Girolamo | H04B 17/318 |
| 2021/0281995 A1* | 9/2021 | Kumar | H04W 8/12 |
| 2021/0297844 A1* | 9/2021 | Prabhakar | H04W 48/18 |
| 2021/0314762 A1* | 10/2021 | Wong | H04W 76/27 |
| 2022/0053313 A1* | 2/2022 | Prakasam | H04W 8/20 |
| 2022/0053444 A1* | 2/2022 | Yu | H04W 60/00 |
| 2022/0070752 A1* | 3/2022 | Kim | H04W 36/32 |
| 2022/0158858 A1* | 5/2022 | Qiao | H04W 4/24 |
| 2022/0264275 A1* | 8/2022 | Vamanan | H04W 4/80 |
| 2022/0303945 A1* | 9/2022 | Tsuda | H04W 76/20 |
| 2022/0312182 A1* | 9/2022 | Venkataraman | H04W 76/50 |
| 2022/0312360 A1* | 9/2022 | Kuppelur | H04W 60/04 |
| 2023/0052699 A1* | 2/2023 | Ninglekhu | H04W 48/16 |
| 2023/0092577 A1* | 3/2023 | Qiao | H04W 60/04 370/331 |
| 2023/0133387 A1* | 5/2023 | Suh | H04W 4/90 455/404.1 |
| 2023/0247705 A1* | 8/2023 | Kumar | H04L 65/1095 370/329 |
| 2023/0276342 A1* | 8/2023 | Park | H04W 48/02 370/329 |

FOREIGN PATENT DOCUMENTS

| | | | |
|---|---|---|---|
| EP | 3197212 A1 * | 7/2017 | H04W 48/14 |
| WO | WO-03090013 A2 * | 10/2003 | H04W 36/0022 |
| WO | WO-2020071889 A1 * | 4/2020 | H04W 4/029 |
| WO | WO-2021134167 A1 * | 7/2021 | H04W 48/16 |
| WO | WO-2022035512 A1 * | 2/2022 | H04W 48/18 |
| WO | WO-2022174744 A1 * | 8/2022 | |
| WO | WO-2022228685 A1 * | 11/2022 | |
| WO | WO-2023014602 A1 * | 2/2023 | |

* cited by examiner

ENHANCED PLMN COVERAGE FOR MOBILE DEVICES

BACKGROUND

Mobile devices, such as smart phones, are configured to access a cellular network via cells. Each cell is created by an access point, such as an E-UTRAN Node B (eNodeB or eNB), a Next Generation Node B (gNB), etc. The cell enables radio signal communication for mobile devices within a coverage area surrounding the access point. The access point of a cell is configured to broadcast a public land mobile network (PLMN) code, which includes a Mobile Country Code (MCC) and a Mobile Network Code (MNC). A wireless carrier may provide its subscribers with home PLMN coverage over a large geographical area by assigning a particular PLMN code to multiple cells that are distributed about the geographical area. To augment this home PLMN coverage for its subscribers, the wireless carrier may assign an additional PLMN code(s) to additional cells within the geographical area, and the additional PLMN code(s) can be provided, by the home network, to the subscribers' mobile devices in the form of a list of equivalent PLMNs (sometimes referred to herein as an "ePLMN list") whenever the mobile devices register/attach with the home network of the wireless carrier. A mobile device that receives an ePLMN list at a time of registering/attaching with the home network is able to transition to a target cell that is broadcasting a PLMN code included in the ePLMN list. In this way, the coverage of the wireless carrier's home network can be augmented using equivalent PLMNs.

Pursuant to the $3^{rd}$ Generation Partnership Project (3GPP) Technical Specification (TS) 24.501, in a fifth generation (5G) network, a user equipment (UE) shall update or delete the ePLMN list at the end of each registration procedure. That is, the access and mobility function (AMF) can provide a UE with a list of equivalent PLMNs in a REGISTRATION ACCEPT message, and the UE replaces an existing ePLMN list stored in memory of the UE on each receipt of such a REGISTRATION ACCEPT message. Moreover, if the REGISTRATION ACCEPT message does not contain an ePLMN list, then the UE deletes the stored ePLMN list on receipt of such a REGISTRATION ACCEPT message. Similar UE logic is defined for a fourth generation (4G) Long Term Evolution (LTE) network in 3GPP TS 24.301, the difference being that the UE shall replace or delete the stored ePLMN list on each receipt of an ATTACH ACCEPT message from the mobility management entity (MME). In both cases, a mobile device does not retain the ePLMN list of the home network when the mobile device moves to, and registers with, a roaming network. As a consequence, if the mobile device, after registering/attaching with a roaming network, moves back into the coverage area of a cell that is broadcasting a PLMN code corresponding to an equivalent PLMN of the home network, the mobile device will not be able to utilize that cell until the mobile device registers with the home network for a second time.

BRIEF DESCRIPTION OF THE DRAWINGS

The detailed description is set forth with reference to the accompanying figures, in which the left-most digit of a reference number identifies the figure in which the reference number first appears. The use of the same reference numbers in different figures indicates similar or identical items or features.

FIG. 2 further illustrates the UE enhancing its PLMN coverage by keeping track of PLMN codes from a previously-received list(s) of equivalent PLMNs, as well as the UE performing a handover procedure to transition from a serving cell to a target cell, in accordance with various embodiments.

DETAILED DESCRIPTION

Figure 1:
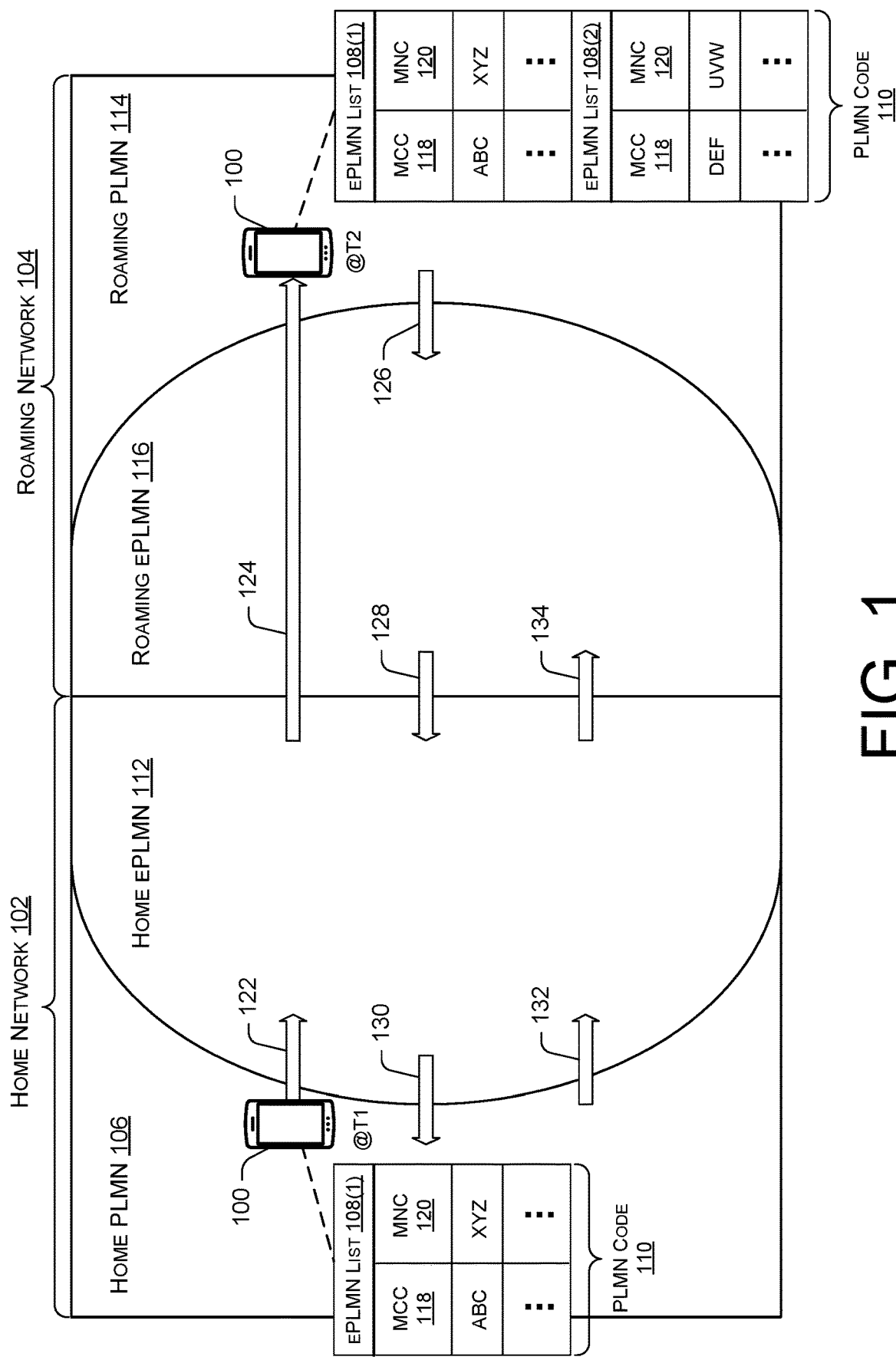
FIG. 1 illustrates an example a mobile device as the mobile device moves between a home network and a roaming network, as well as a technique for the mobile device to enhance PLMN coverage by keeping track of PLMN codes from a previously-received list(s) of equivalent PLMNs, in accordance with various embodiments.

Existing mobile devices are configured to replace a stored list of equivalent PLMNs (also referred to herein as an "ePLMN list") on each receipt of a REGISTRATION ACCEPT message from an AMF node in a 5G network, and on each receipt of an ATTACH ACCEPT message from a MME in a 4G LTE network. Accordingly, whenever a mobile device performs a new registration procedure, it "forgets" the PLMN code(s) that was/were previously stored in memory of the mobile device. This occurs, for example, when the mobile device moves from a home network to a roaming network, or vice versa.

Disclosed herein are techniques, devices, and systems for a mobile device to keep track of PLMN codes from a list(s) of equivalent PLMNs (an ePLMN list(s)) that the mobile device received at a time of performing a past registration procedure(s). That is, during a registration procedure with a roaming network, upon a mobile device receiving a message, such as a REGISTRATION ACCEPT message from an AMF node or an ATTACH ACCEPT message from a MME, the mobile device refrains from deleting, from memory of the mobile device, a stored PLMN code(s) associated with a home network. As such, the mobile device "remembers" the PLMN code(s) associated with the home network that it previously received in an ePLMN list(s) at a time of performing a past registration procedure(s) with the home network. In this manner, the mobile device can avail itself of home ePLMN coverage, for example, if and when a target cell broadcasting a stored PLMN code becomes available to the mobile device. This improves cellular network coverage for the mobile device. For example, instead of a mobile device roaming or having no service at its present location, the mobile device may be provided with home ePLMN coverage in instances where a target cell of the home network is broadcasting a PLMN code from a list(s) of equivalent PLMNs (an ePLMN list(s)) that the mobile device received during a past registration procedure(s) with the home network.

In an illustrative example, at a first time of registering with a home network, a mobile device may send a message (e.g., a REGISTRATION REQUEST message to an AMF node or an ATTACH REQUEST message to a MME). In response, the mobile device may receive a message (e.g., a REGISTRATION ACCEPT message from the AMF node or an ATTACH ACCEPT message from the MME) that includes a list of equivalent PLMNs (an ePLMN list). The mobile device may store one or more PLMN codes from the ePLMN list in memory of the mobile device. Subsequently, at a second time of registering with a roaming network, the mobile device may send another message (e.g., a REGISTRATION REQUEST message to another AMF node or an ATTACH REQUEST message to another MME). In response, the mobile device may receive another message (e.g., a REGISTRATION ACCEPT message from the other AMF node or an ATTACH ACCEPT message from the other MME). In response to receiving the message, the mobile device can maintain the stored PLMN code(s) (from the ePLMN list) in the memory of the mobile device, rather than replacing or deleting the stored PLMN code(s).

The disclosed techniques, devices, and systems improve (e.g., expand, enhance, etc.) home network coverage for a mobile device by virtue of the mobile device being able to recall, or remember, a PLMN code(s) received by the mobile device in an ePLMN list(s) at a time of performing a past registration procedure(s) with the home network, as opposed to erasing the stored PLMN code(s) in response to the mobile devices moving to a roaming network, for example. With this improved home network coverage, and assuming that an equivalent PLMN of a home network is available to a mobile device, the mobile device is configured to refrain from registering with a roaming network (if a roaming network is even available) and to register with the home network instead. By registering with a home network, a mobile device is provided with better service, as compared to services provided while roaming. For example, a roaming network may not support the same types of services as a home network supports, such as video calling, Voice over LTE (VoLTE), Voice over New Radio (VoNR), or the like. Moreover, utilization of a roaming network typically involves a roaming agreement that results in higher charges while roaming. Accordingly, a mobile device implementing the techniques described herein may be provided with upgraded service by registering with a home network whenever the home network is available to the mobile device. In other words, a mobile device does not have to wait until a next registration with the home network in order to utilize an equivalent PLMN of the home network. Rather, after a first/initial registration with the home network, the mobile device is thereafter prepared to utilize an equivalent PLMN, even after the mobile device subsequently registers with a roaming network.

The techniques, device, and systems described herein may provide various technical benefits, such as improved connectivity and/or operability of mobile devices in weak signal environments. That is, a mobile device implementing the techniques described herein may retain PLMN codes (potentially from multiple lists of equivalent PLMNs received during multiple past registration procedures) in memory of the mobile device so that, as the mobile device moves from one geographical location to the next, the connectivity and/or operability of the mobile device is improved in a weak signal environment. That is, if a mobile device has no other coverage besides home ePLMN coverage, the mobile device can utilize the home ePLMN coverage instead of potentially having no service at its present location. The techniques, devices, and systems described herein may further allow one or more devices to conserve resources with respect to processing resources, memory resources, networking resources, power resources, etc., in the various ways described herein. For example, by storing, in memory of a mobile device, multiple separate lists of equivalent PLMNs, a mobile device may conserve processing resources by selectively traversing one of the stored ePLMN lists to find a suitable or preferred PLMN code while ignoring the other stored ePLMN list(s). In other examples described herein, a mobile device may delete, from memory of the mobile device, one or more PLMN codes and/or ePLMN lists (e.g., after a period of time without utilizing the stored PLMN code(s) and/or the stored ePLMN list(s)) to free up storage space in the memory of the mobile device.

Disclosed herein are processes, as well as systems comprising one or more processors and one or more memories (e.g., non-transitory computer-readable media) storing computer-executable instructions that, when executed by the one or more processors perform various acts and/or processes disclosed herein.

FIG. 1 illustrates an example a mobile device 100 as the mobile device 100 moves between a home network 102 and a roaming network 104, as well as a technique for the mobile device 100 to enhance PLMN coverage by keeping track of PLMN codes from a previously-received list(s) of equivalent PLMNs, in accordance with various embodiments. Users of mobile devices, such as the mobile device 100 depicted in FIG. 1, may be subscribers of services that a wireless carrier (or cellular network operator, telecommunication service provider, etc.) provides to its customers. Such a wireless carrier may utilize the home network 102 for provisioning such services. The home network 102 may represent a cellular network, a telecommunications network, or the like, for delivering services to mobile devices, such as the mobile device 100. For example, a wireless carrier may offer multimedia telephony services that allow a subscribed user to call or message other users via the home network 102 using his/her mobile device 100. A user can also utilize an associated mobile device 100 to receive, provide, or otherwise interact with various different services by accessing a core network via various network nodes. In this manner, a wireless carrier may offer any type of service(s) (e.g., Internet Protocol (IP) Multimedia Subsystem (IMS)-based services), such as telephony services (or voice calling), emergency services (e.g., E911), gaming services, instant messaging services, presence services, video conferencing services, social networking and sharing services, location-based services, push-to-talk services, WiFi calling services, real time text (RTT) services, RTT calling services and/or video calling services, and so on. In order to access one or more of these services, mobile devices, such as the mobile device 100, are configured to connect with a serving cell, complete a registration procedure, and thereafter request establishment of a communication session via the serving cell.

As noted above, an access point (e.g., an eNB, gNB, etc.) of a cell is configured to broadcast a PLMN code, which includes a MCC and a MNC. The wireless carrier may provide its subscribers with home PLMN 106 coverage over a large geographical area by assigning a particular PLMN code to multiple cells that are distributed about the geographical area. To augment the home network 102 coverage for its subscribers, the wireless carrier may also assign one or more additional PLMN codes to additional cells within the geographical area, and these additional PLMN code(s) can be provided, by the home network 102, to the subscribers' mobile devices in the form of a list of equivalent PLMNs (sometimes referred to herein as an "ePLMN list" 108(1)) whenever the mobile devices register with the home network 102 of the wireless carrier. FIG. 1 depicts the mobile device 100 as having received the ePLMN list 108(1) at a time of registering with the home network 102. Thereafter, the mobile device 100 is able to transition to a target cell that is broadcasting a PLMN code 110 included in the ePLMN list 108(1), which augments the coverage of the wireless carrier's home network 102. This augmented coverage is represented in FIG. 1 by the home ePLMN 112 coverage of the home network 102.

A roaming partner of the wireless carrier may operate the roaming network 104. Through a roaming agreement, the roaming partner may agree to allow subscribers of the wireless carrier to utilize the roaming network 104. When the mobile device 100 registers with the roaming network 104, the subscriber/user of the mobile device 100 may be unable to receive some of the services that are otherwise available to the subscriber/user via the home network 102, such as video calling and/or other services, yet the subscriber/user may still be able to receive basic services, such as voice calling, texting, and the like. Thus, the mobile device 100 may prefer attachment to the home network 102 in order to receive a full suite of services, yet the mobile device 100 may attach to the roaming network 104 if the home network 102 is unavailable in order to be provisioned with at least some basic services.

The roaming network 104 may be configured in a similar way to the home network 102. That is, the roaming partner may provide subscribers of the wireless carrier with roaming PLMN 114 coverage by assigning a particular PLMN code to multiple cells within a geographical area, and this roaming PLMN 114 coverage may be augmented by assigning one or more additional PLMN codes to additional cells within the geographical area, the additional PLMN code(s) being provided, by the roaming network 104, to mobile devices in another ePLMN list 108(2) whenever the mobile devices register with the roaming network 104. A mobile device 100 that receives an ePLMN list 108(2) at a time of registering with the roaming network 104 is thereafter able to transition to a target cell that is broadcasting a PLMN code 110 included in the ePLMN list 108(2), which augments the coverage of the roaming network 104. This augmented coverage is represented in FIG. 1 by the roaming ePLMN 116 coverage of the roaming network 104. It is to be appreciated, however, that the roaming network 104, in some examples, may not provide roaming ePLMN 116 coverage, and, in those examples, the roaming network 104 may not provide an ePLMN list within a REGISTRATION ACCEPT message or an ATTACH ACCEPT message sent to the mobile device 100 at a time of registering with the roaming network 104.

The mobile device 100 may be implemented as any suitable mobile computing device configured to communicate over a wireless network, including, without limitation, a mobile phone (e.g., a smart phone), a tablet computer, a laptop computer, a portable digital assistant (PDA), a wearable computer (e.g., electronic/smart glasses, a head-mounted display (HMD), a smart watch, fitness trackers, etc.), and/or any similar mobile device 100. In accordance with various embodiments described herein, the terms "wireless communication device," "wireless device," "communication device," "mobile device," "computing device," "electronic device," "user device," and "user equipment (UE)" may be used interchangeably herein to describe any mobile device 100 capable of performing the techniques described herein. The mobile device 100 may be capable of communicating wirelessly using any suitable wireless communications/data technology, protocol, or standard, such as Global System for Mobile Communications (GSM), Time Division Multiple Access (TDMA), Universal Mobile Telecommunications System (UNITS), Evolution-Data Optimized (EVDO), LTE, Advanced LTE (LTE+), 5G, Generic Access Network (GAN), Unlicensed Mobile Access (UMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), High Speed Packet Access (HSPA), evolved HSPA (HSPA+), Voice over IP (VoIP), VoLTE, VoNR—e.g., 5G, IEEE 802.1x protocols, WiMAX, Wi-Fi, Data Over Cable Service Interface Specification (DOCSIS), digital subscriber line (DSL), and/or any future IP-based network technology or evolution of an existing IP-based network technology.

FIG. 1 illustrates the mobile device 100, at a first time, T1, within the home PLMN 106 coverage of the home network 102. In order to access services of the home network 102, the mobile device 100 is configured to complete a registration procedure via a serving cell that is broadcasting a particular PLMN code associated with the home PLMN 106 coverage of the home network 102. This registration procedure may involve the mobile device 100 sending a message to a network node. In a 5G network, this network node may be an AMF node and the message may be a REGISTRATION REQUEST message. In a 4G LTE network, this network node may be a MME and the message may be an ATTACH REQUEST message. In response to sending the message, the mobile device 100 may receive, from the network node (e.g., the AMF node or the MME), a message (e.g., a REGISTRATION ACCEPT message or an ATTACH ACCEPT message). The message received by the mobile device 100 may include a list of equivalent PLMNs (an ePLMN list 108(1)). As depicted in FIG. 1, the mobile device 100 may store one or more PLMN codes 110 from the ePLMN list 108(1) in memory of the mobile device 100.

In some examples, the mobile device 100 stores the ePLMN list 108(1) in memory of the mobile device 100 and labels the ePLMN list 108(1) as a "Home" ePLMN list 108(1). Each entry in the ePLMN list 108(1) may include a MCC 118 and a MNC 120. The combination of the MCC 118 and the MNC 120 constitute a PLMN code 110. In the example of FIG. 1, the example ePLMN list 108(1) includes a fictitious PLMN code 110 "ABC-XYZ", which is associated with the home ePLMN 112 coverage of the home network 102.

The arrow 122 in FIG. 1 represents movement of the mobile device 100 from a geographical location that is within the home PLMN 106 coverage to a geographical location that is outside of the home PLMN 106 coverage and within the home ePLMN 112 coverage. For example, the mobile device 100 may have moved out of range of a serving cell broadcasting a PLMN code 110 associated with the home PLMN 106 coverage, and within range of a target cell broadcasting the PLMN code 110 "ABC-XYZ." Based on this movement and detecting the broadcasted PLMN code 110 "ABC-XYZ", the mobile device 100 may transition from the home PLMN 106 coverage to the home ePLMN 112 coverage (e.g., via a handover procedure, a cell reselection procedure, etc.) by identifying, in the memory of the mobile device 100, the PLMN code 110 "ABC-XYZ" from the ePLMN list 108(1).

The arrow 124 in FIG. 1 represents movement of the mobile device 100 from a geographical location that is within the home ePLMN 112 coverage to a geographical location that is outside of the home ePLMN 112 coverage and within the roaming PLMN 114 coverage. For example, the mobile device 100 may have moved out of range of a serving cell broadcasting the PLMN code 110 "ABC-XYZ", and within range of a target cell broadcasting a PLMN code 110 associated with the roaming PLMN 114 coverage. Accordingly, FIG. 1 illustrates the mobile device 100, at a second time, T2, within the roaming PLMN 114 coverage of the roaming network 104.

At the second time, T2, the mobile device 100 completes another registration/attach procedure via a cell that is broadcasting a particular PLMN code 110 associated with the roaming PLMN 114 coverage of the roaming network 104. This registration procedure may involve the same, or similar, messaging as the previous registration procedure performed by the mobile device 100 with respect to the home network 102. For example, the mobile device 100 may send another message to a network node. In a 5G network, this network node may be another AMF node and the message may be a REGISTRATION REQUEST message. In a 4G LTE network, this network node may be another MME and the message may be an ATTACH REQUEST message. In response to sending the message, the mobile device 100 may receive, from the network node (e.g., the other AMF node or the other MME), another message (e.g., a REGISTRATION ACCEPT message or an ATTACH ACCEPT message).

The example of FIG. 1 illustrates a scenario where the message received by the mobile device 100 includes a list of equivalent PLMNs (an ePLMN list 108(2)). It is to be appreciated, however, that the message may not include an ePLMN list, in some examples. In a scenario where the mobile device 100 receives, from the roaming network 104, a REGISTRATION ACCEPT message or an ATTACH ACCEPT message that omits an ePLMN list, the mobile device 100 may refrain from storing any new PLMN codes 110 and/or any new ePLMN lists to conserve memory resources. In other examples, the mobile device 100 may store an "empty" ePLMN list, such as an ePLMN list 108(2) without any PLMN codes 110, or with the PLMN code 110 associated with the roaming PLMN 114 coverage but no other/additional PLMN codes 110.

As depicted in FIG. 1, and in a scenario where the mobile device 100 receives an ePLMN list 108(2) including one or more PLMN codes 110, the mobile device 100 may store the one or more PLMN codes 110 from the ePLMN list 108(2) in memory of the mobile device 100. In some examples, the mobile device 100 stores the ePLMN list 108(2) in memory of the mobile device 100 and labels the ePLMN list 108(2) as a "Roaming" ePLMN list 108(2). Notably, the storing of the ePLMN list 108(2) (and/or the PLMN code(s) 110 included therein) in memory of the mobile device 100 occurs without replacing or otherwise deleting the ePLMN list 108(1) (and/or the PLMN code(s) 110 included therein). In other words, the mobile device 100 maintains the PLMN code(s) 110 of the ePLMN list 108(1) in the memory of the mobile device 100 in response to receiving the message (e.g., a REGISTRATION ACCEPT message or an ATTACH ACCEPT message) at the second time, T2, of registering with the roaming network 104. Accordingly, at the second time, T2, the mobile device 100 may store at least two ePLMN lists 108(1) and 108(2) in memory of the mobile device 100. The ePLMN list 108(1) may correspond to the home ePLMN 112 coverage (and may be labeled as a "Home" ePLMN list 108(1)), and the ePLMN list 108(2) may correspond to the roaming ePLMN 116 coverage (and may be labeled as a "Roaming" ePLMN list 108(2)). Similar to the ePLMN list 108(1), each entry in the ePLMN list 108(2) may include a MCC 118 and a MNC 120, the combination of which constitutes a PLMN code 110. In the example of FIG. 1, the example ePLMN list 108(2) includes a fictitious PLMN code 110 "DEF-UVW", which is associated with the roaming ePLMN 116 coverage of the roaming network 104.

The arrow 126 in FIG. 1 represents movement of the mobile device 100 from a geographical location that is within the roaming PLMN 114 coverage to a geographical location that is outside of the roaming PLMN 114 coverage and within the roaming ePLMN 116 coverage. For example, the mobile device 100 may have moved out of range of a serving cell broadcasting a PLMN code 110 associated with the roaming PLMN 114 coverage, and within range of a target cell broadcasting the PLMN code 110 "DEF-UVW." Based on this movement and detecting the broadcasted PLMN code 110 "DEF-UVW", the mobile device 100 may transition from the roaming PLMN 114 coverage to the roaming ePLMN 116 coverage (e.g., via a handover procedure, a cell reselection procedure, etc.) by identifying, in the memory of the mobile device 100, the PLMN code 110 "DEF-UVW" in the ePLMN list 108(2).

The arrow 128 in FIG. 1 represents movement of the mobile device 100 from a geographical location that is within the roaming ePLMN 116 coverage to a geographical location that is outside of the roaming ePLMN 116 coverage and within the home ePLMN 112 coverage. For example, the mobile device 100 may have moved out of range of a serving cell broadcasting the PLMN code 110 "DEF-UVW", and within range of a target cell broadcasting the PLMN code 110 "ABC-XYZ." Based on this movement and detecting the broadcasted PLMN code 110 "ABC-XYZ", the mobile device 100 may complete another registration/attach procedure via the target cell that is broadcasting the PLMN code "ABC-XYZ" by identifying, in the memory of the mobile device 100, the PLMN code 110 "ABC-XYZ" in the ePLMN list 108(1).

Accordingly, by virtue of the mobile device 100 "remembering" the PLMN code 110 "ABC-XYZ", the mobile device 100 can avail itself of home ePLMN 112 coverage when the home ePLMN 112 coverage becomes available to the mobile device 100 (e.g., at the arrow 128 depicted in FIG. 1), and without waiting until the mobile device 100 registers with the home network 102 for a second time via a cell that is broadcasting the PLMN code 110 associated with the home PLMN 106 coverage. In some examples, after the movement represented by the arrow 128, and upon re-registering with the home network 102, the mobile device 100 may receive a "fresh" (e.g., new, updated, etc.) ePLMN list 108(1) from the home network 102. If the PLMN code(s) 110 in the fresh ePLMN list 108(1) is/are the same as the stored PLMN code(s) 110 from the previously-received ePLMN list 108(1), the mobile device 100 may discard the "fresh" ePLMN list 108(1), seeing as how the mobile device 100 already has these PLMN codes 110 stored in memory. In the event that the "fresh" ePLMN list 108(1) (received after the movement represented by the arrow 128) includes a new PLMN code(s) 110 and/or omits a stored PLMN code 110 that was included in the previously-received ePLMN list 108(1), the mobile device 100 may update the ePLMN list 108(1) stored in memory of the mobile device 100 by storing any new PLMN codes 110 and/or deleting any stored PLMN codes 110 that are not included in the "fresh" ePLMN list 108(1).

The arrow 130 in FIG. 1 represents movement of the mobile device 100 from a geographical location that is within the home ePLMN 112 coverage to a geographical location that is outside of the home ePLMN 112 coverage and within the home PLMN 106 coverage. For example, the mobile device 100 may have moved out of range of a serving cell broadcasting the PLMN code 110 "ABC-XYZ", and within range of a target cell broadcasting the PLMN code 110 associated with the home PLMN 106 coverage. Based on this movement and detecting the broadcasted PLMN code 110 associated with the home PLMN 106 coverage, the mobile device 100 may transition from the home ePLMN 112 coverage to the home PLMN 106 coverage (e.g., via a handover procedure, a cell reselection procedure, etc.).

The arrow 132 in FIG. 1 represents movement of the mobile device 100 from a geographical location that is within the home PLMN 106 coverage to a geographical location that is outside of the home PLMN 106 coverage and within the home ePLMN 112 coverage. Based on this movement and detecting the broadcasted PLMN code 110 "ABC-XYZ", the mobile device 100 may transition from the home PLMN 106 coverage to the home ePLMN 112 coverage (e.g., via a handover procedure, a cell reselection procedure, etc.) by identifying, in the memory of the mobile device 100, the PLMN code 110 "ABC-XYZ" in the ePLMN list 108(1), as described above with reference to the arrow 122.

The arrow 134 in FIG. 1 represents movement of the mobile device 100 from a geographical location that is within the home ePLMN 112 coverage to a geographical location that is outside of the home ePLMN 112 coverage and within the roaming ePLMN 116 coverage. For example, the mobile device 100 may have moved out of range of a serving cell broadcasting the PLMN code 110 "ABC-XYZ", and within range of a target cell broadcasting the PLMN code 110 "DEF-UVW." Based on this movement and detecting the broadcasted PLMN code 110 "DEF-UVW", the mobile device 100 may complete another registration/attach procedure via the target cell that is broadcasting the PLMN code "DEF-UVW" by identifying, in the memory of the mobile device 100, the PLMN code 110 "DEF-UVW" in the ePLMN list 108(2).

Accordingly, by virtue of the mobile device 100 "remembering" the PLMN code 110 "DEF-UVW", the mobile device 100 can avail itself of roaming ePLMN 116 coverage when the roaming ePLMN 116 coverage becomes available to the mobile device 100, and without waiting until the mobile device 100 registers with the roaming network 104 for a second time via a cell that is broadcasting the PLMN code 110 associated with the roaming PLMN 114 coverage. This roaming ePLMN 116 coverage may be preferable to a no service condition. In some examples, after the movement represented by the arrow 134, and upon re-registering/re-attaching with the roaming network 104, the mobile device 100 may receive a "fresh" ePLMN list 108(2). If the PLMN code(s) 110 in the "fresh" ePLMN list 108(2) is/are the same as the stored PLMN code(s) 110 from the previously-received ePLMN list 108(2), the mobile device 100 may discard the "fresh" ePLMN list 108(2), seeing as how the mobile device 100 already has these PLMN code(s) 110 stored in memory. In the event that the "fresh" ePLMN list 108(2) (received after the movement represented by the arrow 134) includes a new PLMN code(s) 110 and/or omits a PLMN code 110 that was included in the previously-received ePLMN list 108(2), the mobile device 100 may update the ePLMN list 108(2) by storing any new PLMN codes 110 and/or deleting any stored PLMN codes 110 that are not included in the "fresh" ePLMN list 108(2).

Figure 2:
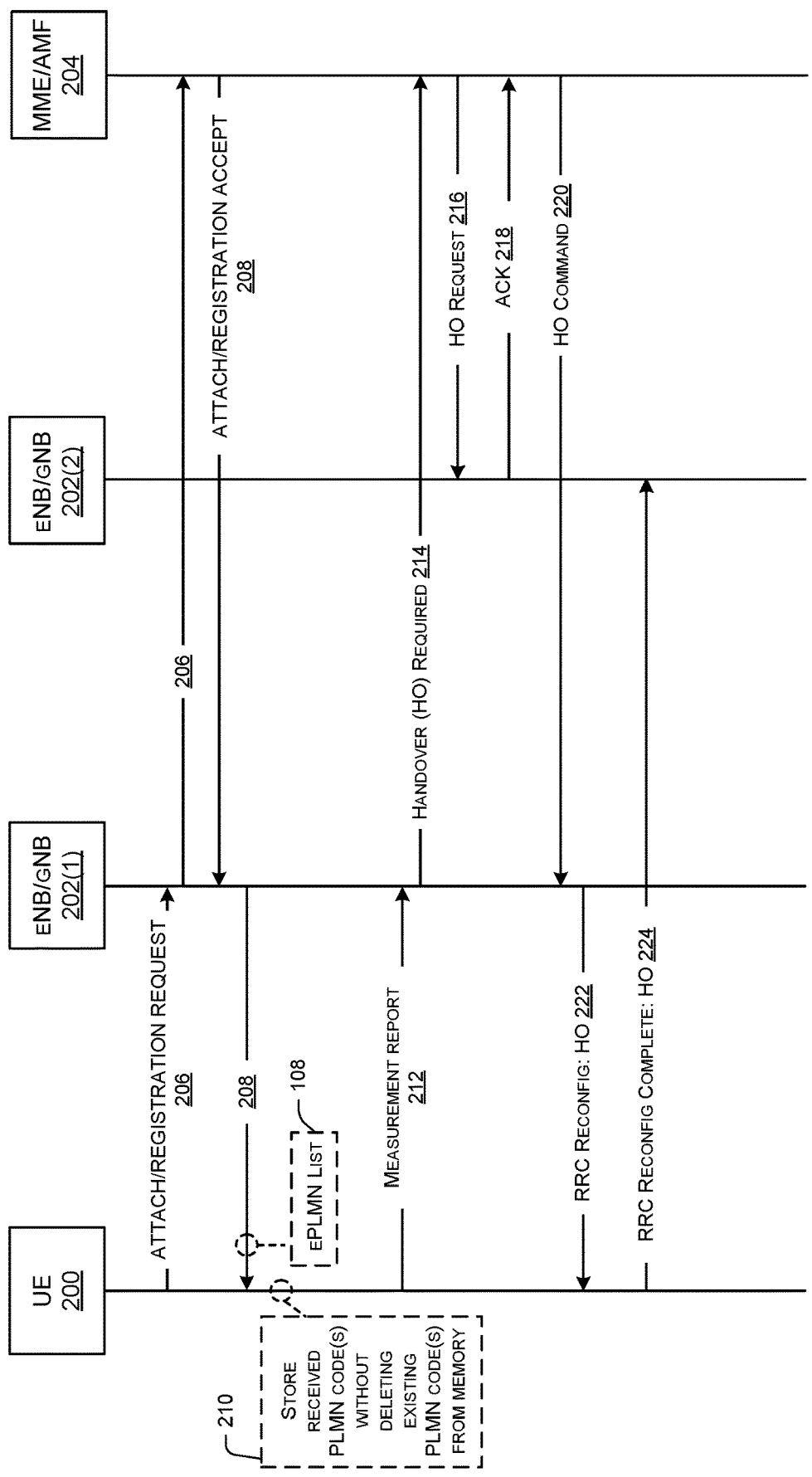
FIG. 2 is a diagram illustrating example signaling between a UE and various nodes of a cellular network, the UE receiving a list of equivalent PLMNs at a time of registration, in accordance with various embodiments.

FIG. 2 is a diagram illustrating example signaling between a UE 200 and various nodes of a cellular network, the UE 200 receiving a list of equivalent PLMNs (an ePLMN list 108) at a time of registration, in accordance with various embodiments. FIG. 2 further illustrates the UE 200 enhancing its PLMN coverage by keeping track of PLMN codes 110 from a previously-received ePLMN list(s) 108, as well as the UE 200 performing a handover procedure to transition from a serving cell to a target cell, in accordance with various embodiments. The UE 200 may represent the mobile device 100 of FIG. 1, in some examples.

FIG. 2 depicts various nodes (or network elements) of a cellular network including a first eNB/gNB 202(1), a second eNB/gNB 202(2), and a MME/AMF node 204. That is, the nodes 202(1) and/or 202(2) can represent an eNB or a gNB, and the node 204 can represent a MME or an AMF node, depending on the type of network (e.g., 4G or 5G). It is to be appreciated that a cellular network can include additional nodes that are not shown in FIG. 2, such as nodes including, without limitation, IMS nodes, such as a proxy call session control function (P-CSCF node), a serving CFCF (S-CSCF) node, an interrogating CSCF (I-CSCF) node, an emergency CSCF (E-CSCF) node, a security gateway (SEG), other 5G core nodes, other 4G LTE nodes, and so on. Furthermore, the UE 200 and any of the nodes (or network elements) described herein may be capable of transmitting/receiving data using any suitable communications/data technology, protocol, or standard, including those mentioned herein with respect to the mobile device 100. In particular, the signaling between the UE 200 and the MME/AMF node 204 may utilize Non-Access Stratum (NAS) protocol. Furthermore, the nodes depicted in FIG. 2 may be associated with a home wireless carrier and/or a home network 102, or the nodes depicted in FIG. 2 may be associated with a roaming partner of the wireless carrier and/or a roaming network 104. In the examples below, the nodes depicted in FIG. 2 are often described as being associated with a roaming partner of the wireless carrier and/or a roaming network 104 to illustrate the logic for keeping track of previously-received PLMN codes 110, which might have been received by the UE 200 at a time of registering with a home network 102 of a wireless carrier.

FIG. 2 depicts the UE 200 sending a message 206 to the MME/AA/IF node 204. If the UE 200 is utilizing a 4G LTE network, the message 206 may represent an ATTACH REQUEST message sent to an MME 204. If the UE 200 is utilizing a 5G network, the message 206 may represent a REGISTRATION REQUEST message sent to an AMF node 204. As illustrated, the message 206 may be sent to the first eNB/gNB 202(1) and then forwarded by the first eNB/gNB 202(1) to the MME/AMF node 204. In response, the UE 200 may receive a message 208 from the MME/AMF node 204. If the UE 200 is utilizing a 4G LTE network, the message 208 may represent an ATTACH ACCEPT message received from the MME 204 that received the message 206. If the UE 200 is utilizing a 5G network, the message 208 may represent a REGISTRATION ACCEPT message received from the AMF node 204 that received the message 206.

The example of FIG. 2 illustrates a scenario where the message 208 received by the UE 200 includes a list of equivalent PLMNs (an ePLMN list 108). Again, it is to be appreciated that the message 208 may not include an ePLMN list 108, in some examples. As depicted in FIG. 2, the UE 200 may, at 210, store one or more PLMN codes 110 from the ePLMN list 108 in memory of the UE 200. In some examples, the UE 200 stores the ePLMN list 108 in memory of the UE 200 and labels the ePLMN list 108 with a label that indicates the type of network with which the UE 200 is registering, such as a "Roaming" ePLMN list 108 if the UE 200 is registering with a roaming network 104. Notably, the storing of the ePLMN list 108 in memory of the UE 200 at 210 occurs without replacing or otherwise deleting existing PLMN codes 210 from the memory of the UE 200. For example, the UE 200, at a time of sending the message 206, may have already stored, in memory of the UE 200, one or more PLMN codes 110 associated with a home network 102 (e.g., a "Home" ePLMN list 108(1)). In this example, on receipt of the message 208, the UE 200 is configured to maintain the stored PLMN code(s) 110 associated with the home network 102 in the memory of the UE 200. If the UE 200 is configured to store separate ePLMN lists, such as a "Home" ePLMN list 108(1) and a "Roaming" ePLMN list 108(2), the UE 200 may store the received ePLMN list 108 and label it as a "Roaming" ePLMN list 108(2), thereby storing two separate ePLMN lists 108(1) and 108(2) in memory of the UE 200. In some examples, the UE 200 is configured to store a single ePLMN list 108 in memory of the UE 200. In the "single-list" implementation, the UE 200 may append the existing ePLMN list 108 that is stored in memory of the UE 200 with the one or more PLMN codes 110 received in the message 208.

It is to be appreciated that any suitable number of ePLMN lists 108 can be maintained in memory of the UE 200, storage space permitting. That is, as long as there is available storage space in the memory of the UE 200, the UE 200 may store any number of PLMN codes 110 and/or ePLMN lists 108 received during performance of registration procedures with different networks. In some examples, the UE 200 may be configured to delete, from memory of the UE 200, PLMN codes 110 and/or ePLMN lists 108 to free up storage space in the memory of the UE 200. This deletion of PLMN codes 110 and/or ePLMN lists 108 can be performed after a period of time without utilizing the stored PLMN code(s) 110 and/or the stored ePLMN list(s) 108. Additionally, or alternatively, if the UE 200 receives an ATTACH ACCEPT message or a REGISTRATION ACCEPT message that includes an ePLMN list 108, the UE 200 may be configured to determine if there is sufficient storage space (e.g., a number of bytes) available in the memory of the UE 200 to store the PLMN code(s) 110 received in the ATTACH ACCEPT message or a REGISTRATION ACCEPT message. If the UE 200 does not have enough storage space to store the received PLMN code(s) 110, the UE 200 may use a least-recently used algorithm to determine stored PLMN codes 110 that are to be deleted (e.g., those that were least-recently used). This way, the most-recently used PLMN codes 110 are maintained in memory of the UE 200. In other examples, the UE 200 may determine to refrain from storing one or more PLMN codes 110 received in the ATTACH ACCEPT message or a REGISTRATION ACCEPT message, if, for example, it is preferable to store "Home" PLMN codes 110 over "Roaming" PLMN codes 110.

In some examples, the UE 200 is configured to implement handover to equivalent PLMN, such as an N2-based HO based on 3GPP. For example, FIG. 2 depicts the UE 200 sending a measurement report 212 to the first eNB/gNB 202(1) (or serving cell). This measurement report 212 may include one or more signal strength measurements of a radio signal(s) associated with eNBs/gNBs nearby, such as the first eNB/gNB 202(1) (or serving cell) and a second eNB/gNB 202(2) (or target cell), which may be used by the first eNB/gNB 202(1) to determine whether to initiate a handover procedure, or the like. For example, the first eNB/gNB 202(1) may be configured to compare the measured signal strength to a threshold to determine whether to transition the UE 200 to a neighboring cell (or target cell), such as the cell associated with the second eNB/gNB 202(2). In the example of FIG. 2, the determination is to handover the UE 200 to the second eNB/gNB 202(2) (or cell). Accordingly, the first eNB/gNB 202(1) (or serving cell) may send a handover (HO) Required message 214 to the MME/AMF node 204, the MME/AMF node 204 may send a HO request 216 to the second eNB/gNB 202(2) (or target cell), and the MME/AMF node 204 may receive an acknowledgement (ACK) 218 of the HO request 216 from the second eNB/gNB 202(2) (or target cell). With the acknowledgement 218 received from the second eNB/gNB 202(2) (or target cell), the MME/AMF node 204 may send a HO command 220 to the first eNB/gNB 202(1) (or serving cell), and the first eNB/gNB 202(1) (or serving cell) may send a radio resource control (RRC) reconfiguration message 222 to the UE 200. The UE 200 receives the RRC reconfiguration message 222 from the first eNB/gNB 202(1) (or serving cell), and sends a RRC reconfiguration complete message 224 to the second eNB/gNB 202(2) (or target cell) when the HO is complete. In some examples, this HO to equivalent PLMN is an Xn/X2 based inter-gNB/eNB HO based on 3GPP.

If the UE 200 is in RRC inactive state or RRC idle state, the UE 200 may perform cell reselection to transition from home/roaming PLMN to a cell belonging to one of the PLMN codes in home/roaming ePLMN list, or vice versa.

The processes described in this disclosure may be implemented by the architectures described herein, or by other architectures. These processes are illustrated as a collection of blocks in a logical flow graph. Some of the blocks represent operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order or in parallel to implement the processes. It is understood that the following processes may be implemented on other architectures as well.

Figure 3:
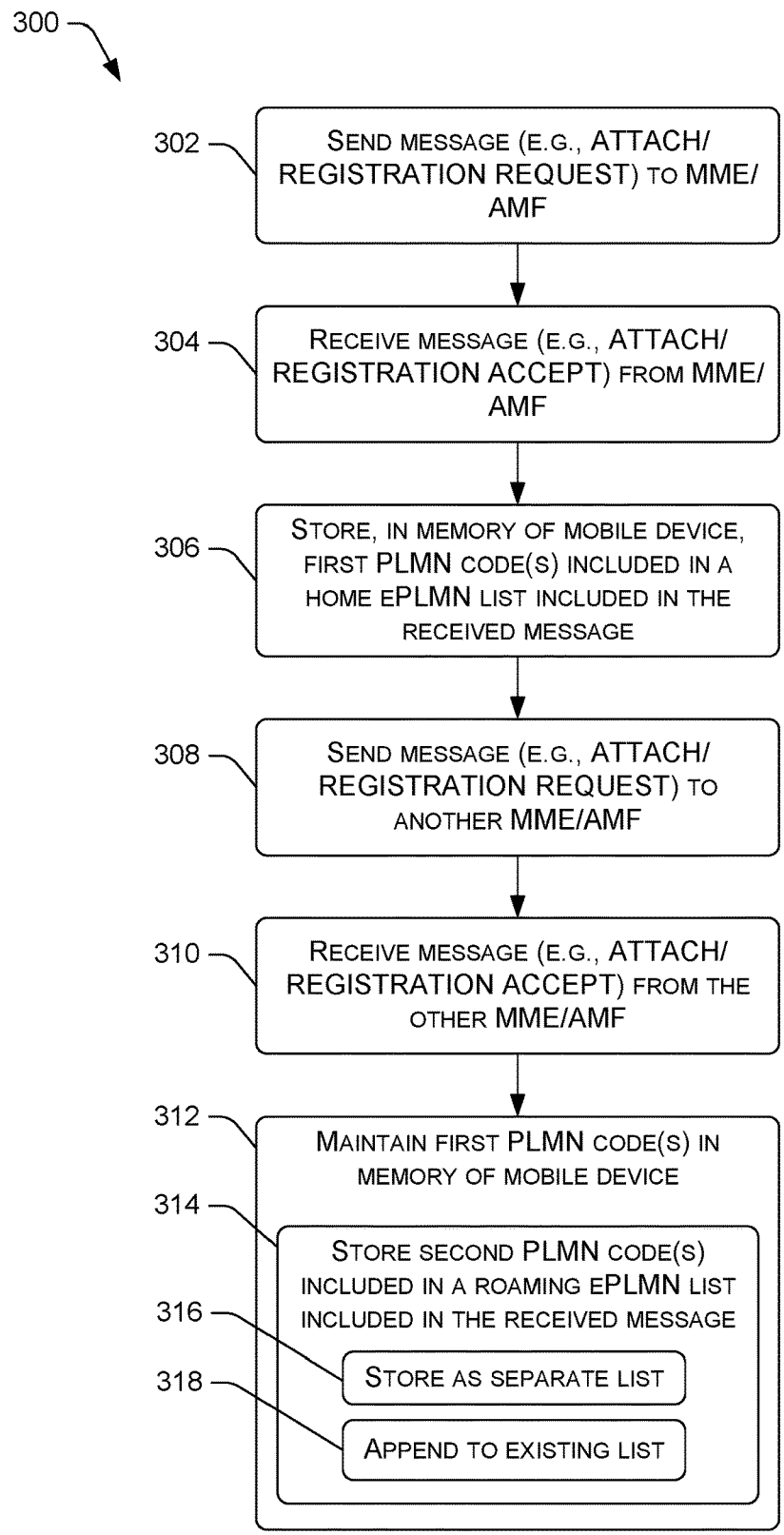
FIG. 3 illustrates a flowchart of an example process implemented by a mobile device for enhancing PLMN coverage by keeping track of PLMN codes from a previously-received list(s) of equivalent PLMNs, in accordance with various embodiments.

FIG. 3 illustrates a flowchart of an example process 300 implemented by a mobile device 100 for enhancing PLMN coverage by keeping track of PLMN codes 110 from a previously-received list(s) of equivalent PLMNs (ePLMN list(s) 108), in accordance with various embodiments. For discussion purposes, the process 300 is discussed with reference to the previous figures.

At 302, a mobile device 100 may send a message to a MME or an AMF node (MME/AMF node). In some examples, the message is an ATTACH REQUEST message sent to a MME, such as when the mobile device 100 is utilizing a 4G LTE network. In some examples, the message is a REGISTRATION REQUEST message sent to an AMF node, such as when the mobile device 100 is utilizing a 5G network. In some examples, the MME/AMF node is associated with a home wireless carrier, and a user of the mobile device 100 is a subscriber (or customer) of the home wireless carrier. In some examples, the MME/AMF node is associated with a home network 102. Accordingly, the message may be sent by the mobile device 100 as part of a registration procedure to register with the home network 102.

At 304, the mobile device 100 may receive, from the MME/AMF node, a message that includes a list of equivalent PLMNs (an ePLMN list 108(1)). In some examples, the message is an ATTACH ACCEPT message received from the MME, such as when the mobile device 100 is utilizing a 4G LTE network. In some examples, the message is a REGISTRATION ACCEPT message received from the AMF node, such as when the mobile device 100 is utilizing a 5G network.

At 306, the mobile device 100 may store, in memory of the mobile device 100, one or more PLMN codes 110 included in the ePLMN list 108(1). In some examples, the ePLMN list 108(1) itself is stored in the memory of the mobile device 100 at block 306. In some examples, the ePLMN list 108(1) is stored and labeled as a "Home" ePLMN list 108(1), if the mobile device 100 is registering with a home network 102 of the wireless carrier. In some examples, the PLMN code(s) 110 from the ePLMN list 108(1) are stored in the memory of the mobile device 100 as a new, local ePLMN list 108(1).

At 308, the mobile device 100 may send another message to another MME or another AMF node (MME/AMF node different than the MME/AMF node). In some examples, the message is an ATTACH REQUEST message sent to another MME, such as when the mobile device 100 is utilizing a 4G LTE network. In some examples, the message is a REGISTRATION REQUEST message sent to another AMF node, such as when the mobile device 100 is utilizing a 5G network. In some examples, the other MME/AMF node is associated with a roaming partner of the home wireless carrier. In some examples, the other MME/AMF node is associated with a roaming network 104. Accordingly, the message may be sent by the mobile device 100 as part of a registration procedure to register with the roaming network 104. It is to be appreciated that, in some examples, the other MME/AMF node is associated with the home wireless carrier, and the original MME/AMF node to which the mobile device 100 sent the message at block 302 is associated with a roaming partner of the home wireless carrier.

At 310, the mobile device 100 may receive, from the other MME/AMF node, another message. The message may or may not include a list of equivalent PLMNs. In some examples, the message is an ATTACH ACCEPT message received from the other MME, such as when the mobile device 100 is utilizing a 4G LTE network. In some examples, the message is a REGISTRATION ACCEPT message received from the other AMF node, such as when the mobile device 100 is utilizing a 5G network.

At 312, in response to the receiving of the message at block 310, the mobile device 100 maintains the PLMN code(s) 110 (from the ePLMN list 108(1) included in the message received at block 304) in the memory of the mobile device 100. In other words, the mobile device 100 refrains from replacing or otherwise deleting the PLMN code(s) 110 that were stored at block 306.

In some examples, the message received at block 310 includes a list of equivalent PLMNs (ePLMN list 108(2)). In some examples, the ePLMN list 108(1) included in the message received at block 304 may be a home ePLMN list, and the ePLMN list 108(2) included in the message received at block 310 may be a roaming ePLMN list. In this example, at sub-block 314, the mobile device 100 may store, in the memory of the mobile device 100, one or more second PLMN codes 110 included in the ePLMN list 108(2).

At sub-block 316, the mobile device 100 may store the second PLMN code(s) 110 (from the ePLMN list 108(2)) in the memory of the mobile device 100 as a separate list from the home ePLMN list 108(1). That is, the mobile device 100 may store separate lists of equivalent PLMNs (or separate ePLMN lists 108(1), 108(2), etc.), each ePLMN list 108 associated with a particular network (e.g., type of network). In an example, the ePLMN list 108(1) may be associated with a home network 102 and the ePLMN list 108(2) may be associated with a roaming network 104. Accordingly, the ePLMN list 108(2) itself can be stored in the memory of the mobile device 100. In some examples, the ePLMN list 108(2) is stored and labeled as a "Roaming" ePLMN list 108(2), if the mobile device 100 is registering with a roaming network 104 of a roaming partner of the wireless carrier.

At sub-block 318, the mobile device 100 may store the second PLMN code(s) 110 (from the ePLMN list 108(2)) in the memory of the mobile device 100 by appending an existing list (e.g., the ePLMN list 108(1)) with the second PLMN code(s) 110 (from the ePLMN list 108(2)). That is, the mobile device 100 may store (e.g., create and store) an ePLMN list 108 in the memory of the mobile device 100 at block 306, and, at sub-block 318, the mobile device 100 may append the second PLMN code(s) 110 (from the ePLMN list 108(2)) to the existing, stored ePLMN list 108. In this example, the mobile device 100 can maintain a single, running list of PLMN codes 110 that are received over the course of performing multiple registration procedures, such as a registration procedure with a home network 102 and a registration procedure with a roaming network 104. Whether to maintain a single ePLMN list 108 or multiple ePLMN lists 108(1), 108(2), etc. in memory of the mobile device 100 may be a design choice. That said, maintaining multiple ePLMN lists 108 may provide technical benefits. For example, if the mobile device 100 prefers attachment to a home network 102 over a roaming network 104, the mobile device 100 may use processing resources to traverse the "Home" ePLMN list 108(1) to identify a PLMN code 110 that is being broadcast by a target cell, and if a PLMN code 110 is identified from the "Home" ePLMN list 108(1), processing resources can be conserved by ignoring a separate "Roaming" ePLMN list 108(2).

Figure 4:
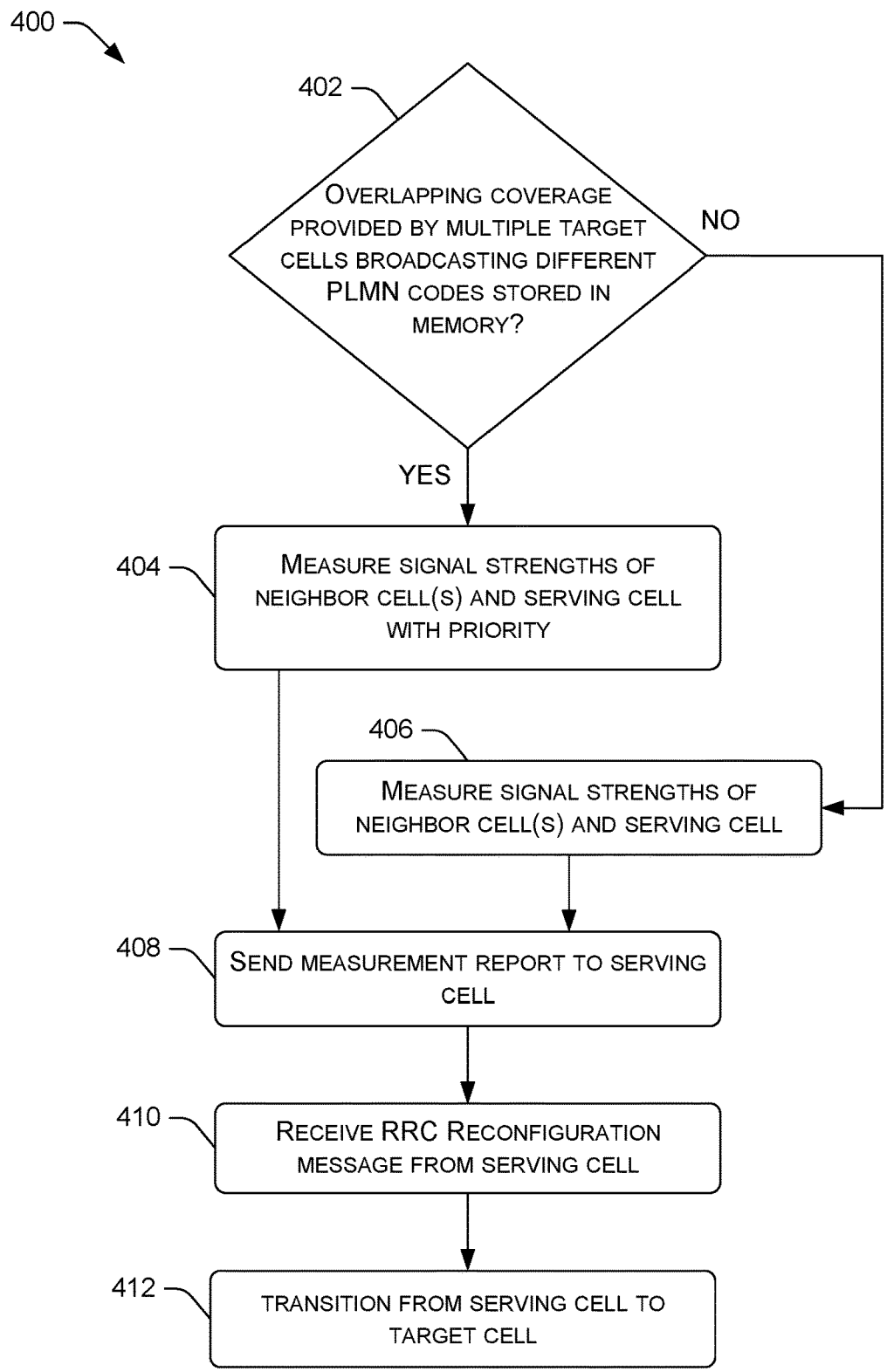
FIG. 4 illustrates a flowchart of an example process for prioritizing selection of target cells that broadcast PLMN codes in a "Home" ePLMN list and deprioritizing selection of target cells that broadcast PLMN codes in a "Roaming" ePLMN list, in accordance with various embodiments.

FIG. 4 illustrates a flowchart of an example process 400 for prioritizing selection of target cells that broadcast PLMN codes 110 in a "Home" ePLMN list 108(1) and deprioritizing selection of target cells that broadcast PLMN codes 110 in a "Roaming" ePLMN list 108(2), in accordance with various embodiments. For discussion purposes, the process 400 is discussed with reference to the previous figures.

At 402, a mobile device 100 may determine whether multiple target cells that are broadcasting different PLMN codes 110 stored in the memory of the mobile device 100 are available to serve the mobile device 100 at its present location, which indicates overlapping PLMN coverage for the mobile device 100. In an example with reference to FIG. 1, the mobile device 100 may be located at a geographical location that is within the home ePLMN 112 coverage and also within the roaming ePLMN 116 coverage. This is just one example combination of overlapping PLMN coverage, and other similar scenarios may arise. If, at block 402, the mobile device 100 determines that multiple target cells broadcasting different PLMN codes 110 stored in the memory of the mobile device 100 are available to serve the mobile device 100 at its present location (e.g., if the mobile device 100 has overlapping PLMN coverage), the process 400 may follow the YES route from block 402 to block 404.

At 404, the mobile device 100 measures respective signal strengths of radio signals associated with its serving cell and the multiple target cells that are broadcasting the different PLMN codes 110, with priority given to home ePLMN frequency if the mobile device 100 is in home or home ePLMNs coverage, and with priority given to roaming ePLMN frequency if the mobile device 100 is in roaming or roaming ePLMNs coverage. That is, if a first target cell is broadcasting a PLMN code 110 associated with a home ePLMN band frequency, a second target cell is broadcasting a PLMN code 110 associated with a roaming ePLMN band frequency, and the mobile device 100 is in home or home ePLMNs coverage, the mobile device 100 may, at block 404, measure the signal strength of the radio signal associated with the first target cell, and may refrain from measuring the signal strength of the radio signal associated with the second target cell. Alternatively, the mobile device 100 may, at block 404, measure the signal strength of the radio signal associated with the first target cell before measuring the signal strength of the radio signal associated with the second target cell. In any case, priority is given to the target cell(s) associated with a home ePLMN frequency if the mobile device 100 is in home or home ePLMNs coverage, and any target cell(s) associated with a roaming ePLMN frequency may be deprioritized. In some examples, the mobile device 100 gives priority to target cells associated with a home network based at least in part on the their broadcasted PLMN codes 110 being included in a list that is associated with a home network (e.g., the "Home" ePLMN list 108(1)). Likewise, the mobile device 100 may deprioritize other target cells associated with a roaming network based at least in part on their broadcasted PLMN codes 110 being included in a list associated with a roaming network (e.g., the "Roaming" ePLMN list 108(2)). At 404, if the mobile device 100 is in roaming or roaming ePLMNs coverage, the mobile device 100 may prioritize measuring the signal strength of the second (roaming) target cell over measuring the signal strength of the first (home) target cell in a similar fashion.

If, at block 402, the mobile device 100 does not detect overlapping PLMN coverage (e.g., if all target cells are associated with the same ePLMN frequency, whether home or roaming), the process 400 may follow the NO route from block 402 to block 406, where the mobile device 100 measures respective signal strengths of radio signals associated with its serving cell and the multiple target cells, as usual, following 3GPP procedure.

At 408, the mobile device 100 sends a measurement report to the serving cell (e.g., eNB/gNB), the measurement report including the signal strength measurements of radio signals measured at either block 404 or block 406. If the measurement report includes the signal strengths measured at block 404, the measurement report may include the prioritized signal strength measurements (e.g., the signal strength measurements associated with target cells broadcasting ePLMN codes of a home network if the mobile device 100 is in home or home ePLMNs coverage), and/or the report may list the prioritized signal strength measurements first in the list of signal strength measurements, and/or the report may otherwise indicate which signal strength measurements are the prioritized signal strength measurements and/or which signal strength measurements are the deprioritized signal strength measurements.

At 410, the mobile device 100 may receive, from the serving cell, a RRC reconfiguration message. An example of this is depicted in FIG. 2 with the RRC reconfiguration message 222 received by the UE 200, which may represent the mobile device 100. On receipt of the RRC reconfiguration message, a procedure to transition the mobile device 100 from the serving cell to a target cell is initiated for the mobile device 100. In the case of overlapping PLMN coverage, where the process 400 followed the YES route from block 402 to block 404, and block 404 to block 408, the target cell indicated in the RRC reconfiguration message received at block 410 is a target cell broadcasting a PLMN code 110 associated with the prioritized ePLMN frequency (e.g., a home ePLMN frequency). That is, the PLMN code 110 broadcasted by the selected target cell may have been received in the past by the mobile device 100 during registration of the mobile device 100 with, say, a home network 102 of the wireless carrier. In at least one example, the mobile device 100 is configured to give priority to target cells that provide home network 102 coverage over roaming network 104 coverage at block 404 when measuring signal strengths, which means that the serving cell prioritizes selection of the target cell that is broadcasting a PLMN code 110 from a "Home" ePLMN list 108(1), for example.

At 412, the mobile device 100 may transition from the serving cell to the selected target cell.

Figure 5:
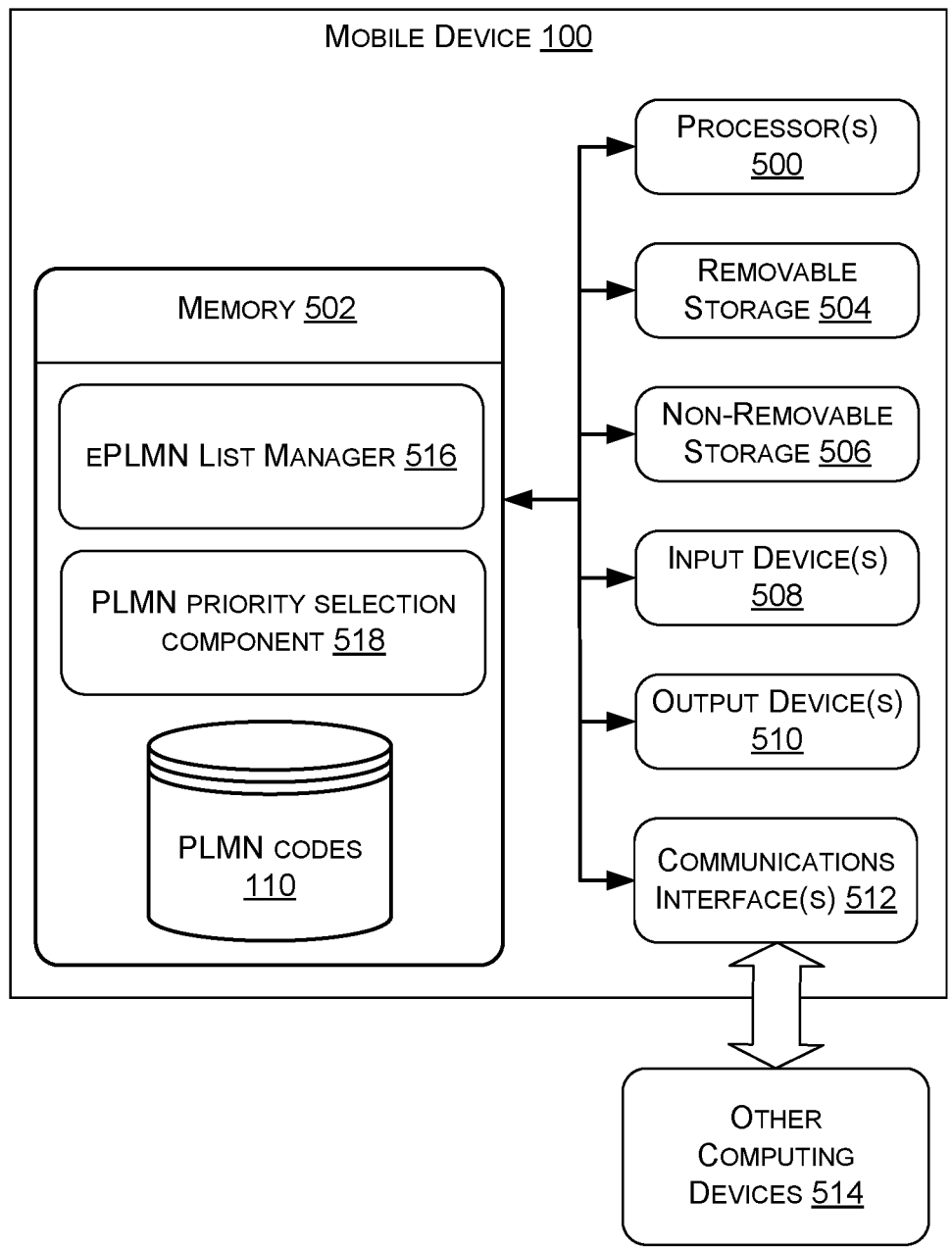
FIG. 5 is a block diagram of an example mobile device architecture in accordance with various embodiments.

FIG. 5 is a block diagram of an example architecture of the mobile device 100 in accordance with various embodiments. As shown, the mobile device 100 may include one or more processors 500 and one or more forms of computer-readable memory 502. The mobile device 100 may also include additional storage devices. Such additional storage may include removable storage 504 and/or non-removable storage 506.

In various embodiments, the computer-readable memory 502 is non-transitory and can include both volatile memory and non-volatile memory (e.g., random access memory (RAM), read-only memory (ROM), erasable programmable read-only memory (EEPROM), Flash Memory, miniature hard drive, memory card, optical storage, magnetic cassettes, magnetic tape, magnetic disk storage or other magnetic storage devices, or any other medium). The non-transitory computer-readable memory 502 may also be described as computer storage media and may include volatile and nonvolatile, removable and non-removable media implemented in any method or technology for storage of information, such as computer readable instructions, data structures, program modules, or other data. Computer-readable memory 502, as well as the removable storage 504 and non-removable storage 506, are all examples of non-transitory computer-readable storage media, and some or all of the memory 502, the removable storage 504, and/or the non-removable storage 506 may constitute the local memory of the mobile device 100, as described herein. Non-transitory computer-readable storage media include, but are not limited to, RAM, ROM, EEPROM, flash memory or other memory technology, compact disc read-only memory (CD-ROM), digital versatile disks (DVD) or other optical storage, magnetic cassettes, magnetic tape, magnetic disk storage or other magnetic storage devices, or any other medium which can be used to store the desired information and which can be accessed by the mobile device 100. Any such non-transitory computer-readable storage media may be part of the mobile device 100.

The mobile device 100 may further include one or more input devices 508, including, without limitation, a touch screen (e.g., touch, or proximity-based) display, physical buttons (e.g., keyboard or keypad), a camera-based sensor configured to receive gestural input from a user, a microphone or microphone array for receiving voice input commands from a user, pointing devices (e.g., mouse, pen, stylus, etc.), or any other suitable input devices 508 coupled communicatively to the processor(s) 500 and the computer-readable memory 502. The mobile device 100 may further include one or more output devices 510, including, without limitation, a display, one or more light-emitting diode (LED) indicators, speakers, a printer, or any other suitable output device coupled communicatively to the processor(s) 500 and the computer-readable memory 502.

The mobile device 100 may further include communications interface(s) 512 that allow the mobile device 100 to communicate with other computing devices 514 such as via a network (e.g., a cellular network, a radio air interface, etc.). The communications interface(s) 512 may facilitate transmitting and receiving wireless signals over any suitable wireless communications/data technology, standard, or protocol, as described above, such as using licensed, semi-licensed, or unlicensed spectrum over a telecommunications network. For example, the communication interface(s) 512 may represent at least one cellular radio (or cellular radio chip/chipset), at least one wireless IEEE 802.1x-based radio interface (e.g., a WiFi radio chip/chipset), as well as other types of wireless (e.g., Bluetooth®) and wireline communications interfaces.

In some embodiments, the computer-readable memory 502 may include an ePLMN list manager 516, a PLMN priority selection component 518, and PLMN codes 110. In general, the ePLMN list manager 516 and/or the PLMN priority selection component 518 represents computer-executable instructions stored in the memory 502 and executable by the processor(s) 500 to perform operations described herein. For example, the ePLMN list manager 516 may be configured to store PLMN codes 110 in the memory 502 on receipt of messages (e.g., ATTACH ACCEPT messages and/or REGISTRATION ACCEPT messages). For example, such messages may include ePLMN lists 108, and the ePLMN list manager 516 may be configured to store the PLMN code(s) 110 contained in the ePLMN lists 108, maintain stored PLMN codes 110 in the memory 502 of the mobile device 100, and/or delete stored PLMN codes 110 and/or stored ePLMN lists 108, as described herein. The PLMN priority selection component 518 may be configured to select a target cell during a transition from a serving cell to the target cell, as described herein, such as by performing the process 400.

The environment and individual elements described herein may of course include many other logical, programmatic, and physical components, of which those shown in the accompanying figures are merely examples that are related to the discussion herein.

The various techniques described herein are assumed in the given examples to be implemented in the general context of computer-executable instructions or software, such as program modules, that are stored in computer-readable storage and executed by the processor(s) of one or more computers or other devices such as those illustrated in the figures. Generally, program modules include routines, programs, objects, components, data structures, etc., and define operating logic for performing particular tasks or implement particular abstract data types.

Other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

I claim:

1. A method comprising:
   sending, by a mobile device, a first message to a first mobility management entity (MME) or a first access and mobility function (AMF) node;
   receiving, by the mobile device, from the first MME or the first AMF node, a second message that includes a first list of equivalent public land mobile networks (PLMNs), wherein the first list of equivalent PLMNs is associated with a home network;
   storing, by the mobile device, in memory of the mobile device, one or more PLMN codes included in the first list of equivalent PLMNs;
   sending, by the mobile device, a third message to a second MME or a second AMF node;
   receiving, by the mobile device, from the second MME or the second AMF node, a fourth message that includes a second list of equivalent PLMNs, wherein the second list of equivalent PLMNs is associated with a roaming network; and
   after receiving the fourth message including the second list of equivalent PLMNs, maintaining, by the mobile device, the one or more PLMN codes of the first list of equivalent PLMNs in the memory.

2. The method of claim 1, wherein:
   the one or more PLMN codes are one or more first PLMN codes;
   and
   the method further comprises storing, by the mobile device, in the memory, one or more second PLMN codes included in the second list of equivalent PLMNs while maintaining the one or more first PLMN codes of the first list of equivalent PLMNs in the memory.

3. The method of claim 2, wherein:
   the storing of the one or more first PLMN codes comprises storing the first list of equivalent PLMNs in the memory; and
   the storing of the one or more second PLMN codes comprises storing the second list of equivalent PLMNs in the memory as a separate list from the first list of equivalent PLMNs.

4. The method of claim 2, wherein:
   the storing of the one or more first PLMN codes comprises storing the first list of equivalent PLMNs in the memory; and
   the storing of the one or more second PLMN codes comprises appending the first list of equivalent PLMNs with the one or more second PLMN codes.

5. The method of claim 2, further comprising:
   determining, by the mobile device, that multiple target cells are available to serve the mobile device, the multiple target cells including:
   a first target cell that is broadcasting a first PLMN code of the one or more first PLMN codes stored in the memory; and
   a second target cell that is broadcasting a second PLMN code of the one or more second PLMN codes stored in the memory;
   measuring, by the mobile device, a first signal strength of a first radio signal associated with the first target cell based at least in part on the first list of equivalent PLMNs being associated with the home network and the second list of equivalent PLMNs being associated with the roaming network;

sending, by the mobile device, a measurement report to a serving cell, the measurement report including the first signal strength measured by the mobile device;

receiving, by the mobile device, from the serving cell, a radio resource control (RRC) reconfiguration request message; and transitioning, by the mobile device, from the serving cell to the first target cell.

6. The method of claim 1, wherein:
the first MME or the first AMF node is associated with the home network; and
the second MME or the second AMF node is associated with the roaming network.

7. The method of claim 1, wherein:
the first message is at least one of a REGISTRATION REQUEST message or an ATTACH REQUEST message; and
the second message is at least one of a REGISTRATION ACCEPT message or an ATTACH ACCEPT message.

8. A mobile device comprising:
a processor; and
memory storing:
  one or more public land mobile network (PLMN) codes from a first list of equivalent PLMNs that the mobile device received from a first mobility management entity (MME) or a first access and mobility function (AMF) node, wherein the first list of equivalent PLMNs is associated with a home network; and
  computer-executable instructions that, when executed by the processor, cause the mobile device to perform operations comprising:
    sending a first message to a second MME or a second AMF node;
    receiving, from the second MME or the second AMF node, a second message that includes a second list of equivalent PLMNs, wherein the second list of equivalent PLMNs is associated with a roaming network; and
    after receiving the second message including the second list of equivalent PLMNs, maintaining the one or more PLMN codes of the first list of equivalent PLMNs in the memory.

9. The mobile device of claim 8, wherein:
the first message is at least one of a REGISTRATION REQUEST message or an ATTACH REQUEST message; and
the second message is at least one of a REGISTRATION ACCEPT message or an ATTACH ACCEPT message.

10. The mobile device of claim 8, wherein:
the one or more PLMN codes are one or more first PLMN codes;
the operations further comprise storing, in the memory, one or more second PLMN codes included in the second list of equivalent PLMNs while maintaining the one or more first PLMN codes of the first list of equivalent PLMNs in the memory.

11. The mobile device of claim 10, wherein:
the memory stores the first list of equivalent PLMNs including the one or more first PLMN codes; and
the storing of the one or more second PLMN codes comprises storing the second list of equivalent PLMNs in the memory as a separate list from the first list of equivalent PLMNs.

12. The mobile device of claim 10, wherein:
the memory stores the first list of equivalent PLMNs including the one or more first PLMN codes; and
the storing of the one or more second PLMN codes comprises appending the first list of equivalent PLMNs with the one or more second PLMN codes.

13. The mobile device of claim 10, the operations further comprising:
determining that multiple target cells are available to serve the mobile device, the multiple target cells including:
  a first target cell that is broadcasting a first PLMN code of the one or more first PLMN codes stored in the memory; and
  a second target cell that is broadcasting a second PLMN code of the one or more second PLMN codes stored in the memory;
measuring a first signal strength of a first radio signal associated with the first target cell based at least in part on the first list of equivalent PLMNs being associated with the home network and the second list of equivalent PLMNs being associated with the roaming network;
sending a measurement report to a serving cell, the measurement report including the first signal strength measured by the mobile device;
receiving, from the serving cell, a radio resource control (RRC) reconfiguration request message; and
transitioning from the serving cell to the first target cell.

14. The mobile device of claim 8, wherein:
the first MME or the first AMF node is associated with the home network; and
the second MME or the second AMF node is associated with the roaming network.

15. A user equipment (UE) comprising:
a processor; and
memory storing:
  one or more public land mobile network (PLMN) codes from a first list of equivalent PLMNs that the UE received from a first mobility management entity (MME) or a first access and mobility function (AMF) node, wherein the first list of equivalent PLMNs is associated with a home network; and
  computer-executable instructions that, when executed by the processor, cause the UE to perform operations comprising:
    sending a first message to a second MME or a second AMF node, wherein the first message is at least one of a REGISTRATION REQUEST message or an ATTACH REQUEST message;
    receiving, from the second MME or the second AMF node, a second message, wherein the second message is at least one of a REGISTRATION ACCEPT message or an ATTACH ACCEPT message and includes a second list of equivalent PLMNs, wherein the second list of equivalent PLMNs is associated with a roaming network; and
    after receiving the second message including the second list of equivalent PLMNs, maintaining the one or more PLMN codes of the first list of equivalent PLMNs in the memory.

16. The UE of claim 15, wherein:
the one or more PLMN codes are one or more first PLMN codes; and
the operations further comprise storing, in the memory, one or more second PLMN codes included in the second list of equivalent PLMNs while maintaining the one or more first PLMN codes of the first list of equivalent PLMNs in the memory.

17. The UE of claim 16, wherein:
the memory stores the first list of equivalent PLMNs including the one or more first PLMN codes; and
the storing of the one or more second PLMN codes comprises storing the second list of equivalent PLMNs in the memory as a separate list from the first list of equivalent PLMNs.

18. The UE of claim 16, wherein:
the memory stores the first list of equivalent PLMNs including the one or more first PLMN codes; and
the storing of the one or more second PLMN codes comprises appending the first list of equivalent PLMNs with the one or more second PLMN codes.

19. The UE of claim 16, the operations further comprising:
determining that multiple target cells are available to serve the UE, the multiple target cells including:
a first target cell that is broadcasting a first PLMN code of the one or more first PLMN codes stored in the memory; and
a second target cell that is broadcasting a second PLMN code of the one or more second PLMN codes stored in the memory;
measuring a first signal strength of a first radio signal associated with the first target cell based at least in part on the first list of equivalent PLMNs being associated with the home network and the second list of equivalent PLMNs being associated with the roaming network;
sending a measurement report to a serving cell, the measurement report including the first signal strength measured by the UE;
receiving, from the serving cell, a radio resource control (RRC) reconfiguration request message; and
transitioning from the serving cell to the first target cell.

20. The UE of claim 15, wherein:
the first MME or the first AMF node is associated with the home network; and
the second MME or the second AMF node is associated with the roaming network.

\* \* \* \* \*